United States Patent
Klassen

(10) Patent No.: US 10,480,671 B2
(45) Date of Patent: Nov. 19, 2019

(54) CONTROL ELEMENT WITH BUCKLED MEMBER

(71) Applicant: Genesis Advanced Technology Inc., Langley (CA)

(72) Inventor: James Brent Klassen, Langley (CA)

(73) Assignee: Genesis Advanced Technology Inc., Langley (CA)

( * ) Notice: Subject to any disclaimer, the term of this patent is extended or adjusted under 35 U.S.C. 154(b) by 195 days.

(21) Appl. No.: 15/529,489

(22) PCT Filed: Nov. 24, 2015

(86) PCT No.: PCT/CA2015/051227
§ 371 (c)(1),
(2) Date: May 24, 2017

(87) PCT Pub. No.: WO2016/082035
PCT Pub. Date: Jun. 2, 2016

(65) Prior Publication Data
US 2017/0261114 A1    Sep. 14, 2017

Related U.S. Application Data

(60) Provisional application No. 62/083,590, filed on Nov. 24, 2014.

(51) Int. Cl.
*F16K 31/00* (2006.01)
*F16K 31/56* (2006.01)
(Continued)

(52) U.S. Cl.
CPC ............ *F16K 31/003* (2013.01); *F04B 39/10* (2013.01); *F16K 31/56* (2013.01); *G05G 3/00* (2013.01);
(Continued)

(58) Field of Classification Search
CPC ......... F16K 31/003; F16K 31/56; H01H 5/18; H01H 5/04; H01H 5/045; H01H 5/02;
(Continued)

(56) References Cited

U.S. PATENT DOCUMENTS 1,446,291 A * 2/1923 Dewey ................... F01B 17/00
                                                                      417/237
3,426,800 A * 2/1969 Bauer ...................... F15C 3/08
                                                                      137/625
(Continued)

FOREIGN PATENT DOCUMENTS

| JP | 2006051598 A | 2/2006 |
| KR | 100837416 B1 | 6/2008 |
| WO | 2013037359 A1 | 3/2013 |

OTHER PUBLICATIONS

International Search Report and Written Opinion dated Mar. 24, 2016, issued in corresponding International Application No. PCT/CA2015/051227, filed Nov. 24, 2015, 8 pages.
(Continued)

*Primary Examiner* — Charles G Freay
(74) *Attorney, Agent, or Firm* — Christensen O'Connor Johnson Kindness, PLLC

(57) ABSTRACT

A control element having a beam member divided into an actuation section and a valve section positioned on opposing sides of a pivot member, in which active control of the actuation section causes buckling of the valve section to bring the valve section from a closed state to an open state or causes relaxing of the valve section to bring the valve section from an open state to a closed state.

12 Claims, 12 Drawing Sheets

(51) Int. Cl.
| | |
|---|---|
| *F04B 39/10* | (2006.01) |
| *H01H 5/18* | (2006.01) |
| *G05G 3/00* | (2006.01) |
| *G05G 5/04* | (2006.01) |
| *H01H 1/26* | (2006.01) |
| *H01H 3/32* | (2006.01) |
| *H01H 5/04* | (2006.01) |

(52) U.S. Cl.
CPC .............. *G05G 5/04* (2013.01); *H01H 5/18* (2013.01); *H01H 3/32* (2013.01); *H01H 5/04* (2013.01); *H01H 5/045* (2013.01); *H01H 2001/265* (2013.01)

(58) Field of Classification Search
CPC ...... H01H 3/32; H01H 1/30; H01H 2001/265; G05G 5/04; G05G 3/00; F04B 39/10; F04B 39/1073; F04B 53/104; F04B 53/1042; F04B 53/1047
USPC .................................................. 417/236, 237
See application file for complete search history.

(56) References Cited

U.S. PATENT DOCUMENTS

| | | | |
|---|---|---|---|
| 3,635,251 A * | 1/1972 | Gaines | F16K 31/56 137/607 |
| 3,963,379 A * | 6/1976 | Ueno | B60T 1/14 417/237 |
| 5,050,838 A | 9/1991 | Beatty et al. | |
| 5,297,775 A * | 3/1994 | Gray | F16K 31/56 251/279 |
| 5,452,878 A | 9/1995 | Gravesen et al. | |
| 5,901,939 A | 5/1999 | Cabuz et al. | |
| 6,168,395 B1 | 1/2001 | Quenzer et al. | |
| 6,911,891 B2 | 6/2005 | Qiu et al. | |
| 8,232,858 B1 | 7/2012 | Garcia et al. | |
| 2003/0029705 A1 | 2/2003 | Qiu et al. | |
| 2004/0032000 A1 | 2/2004 | Ma | |
| 2006/0034562 A1 | 2/2006 | German et al. | |
| 2012/0294730 A1* | 11/2012 | Kline | F04B 41/02 417/1 |
| 2014/0345731 A1* | 11/2014 | Storm | F16K 31/56 137/627.5 |

OTHER PUBLICATIONS

International Preliminary Report on Patentability and Written Opinion dated May 30, 2017, issued in corresponding International Application No. PCT/CA2015/051227, filed Nov. 24, 2015, 6 pages.

Chinese Office Action dated Apr. 16, 2018, issued in corresponding Chinese Application No. 201580072804.5, filed Nov. 24, 2015, 17 pages.

Extended European Search Report dated Jun. 1, 2018, issued in corresponding European Application No. EP 15863363, filed Nov. 24, 2015, 9 pages.

Notice of Reasons for Rejection dated Jul. 30, 2019, issued in corresponding Japanese Application No. 2017-527901, filed Aug. 21, 2015, 19 pages.

* cited by examiner

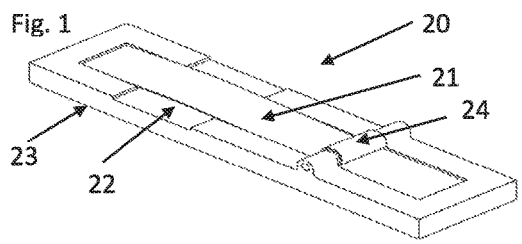
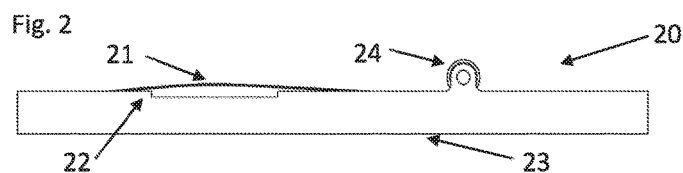
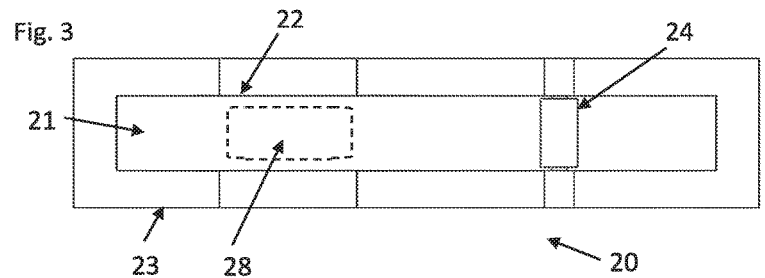
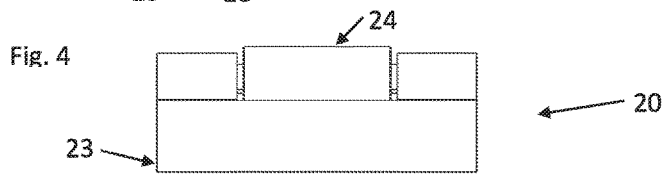
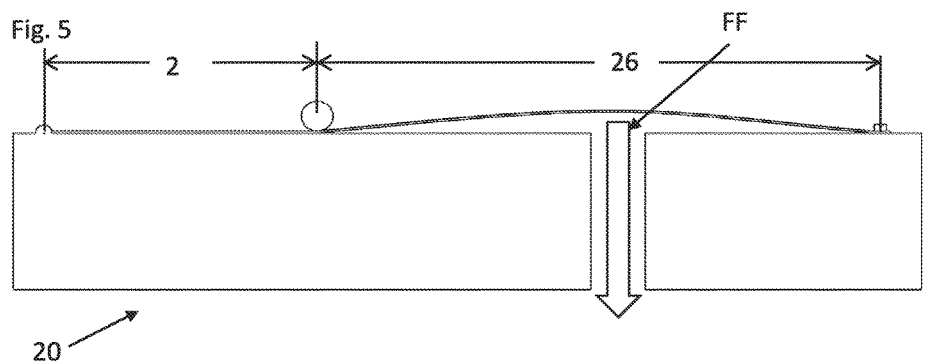

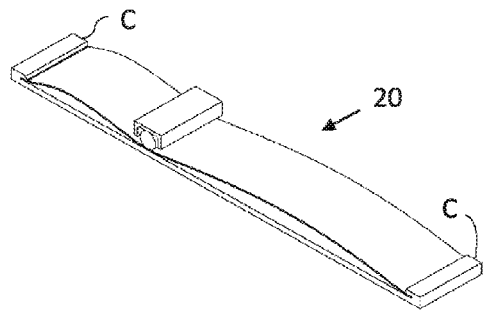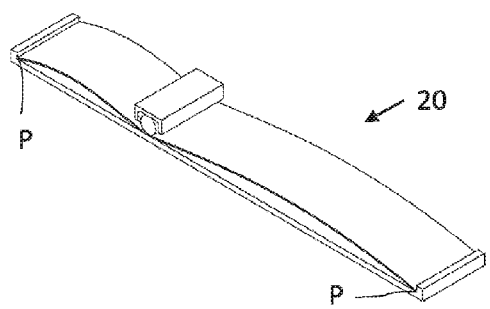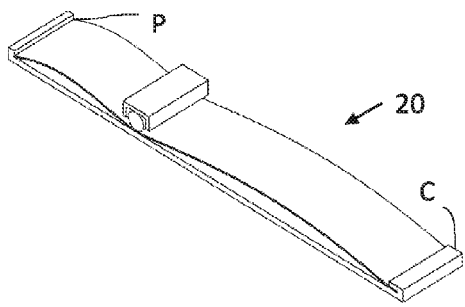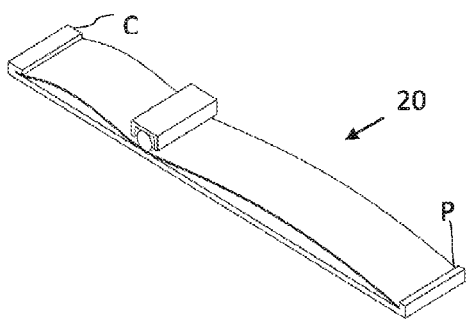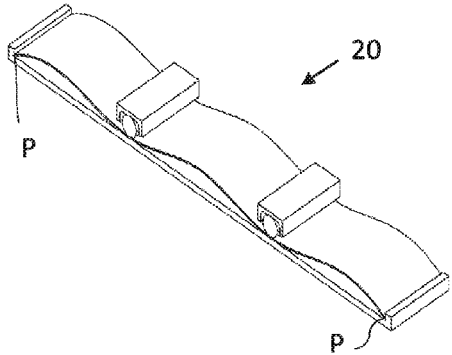

"CLOSED VALVE"

"OPEN VALVE"

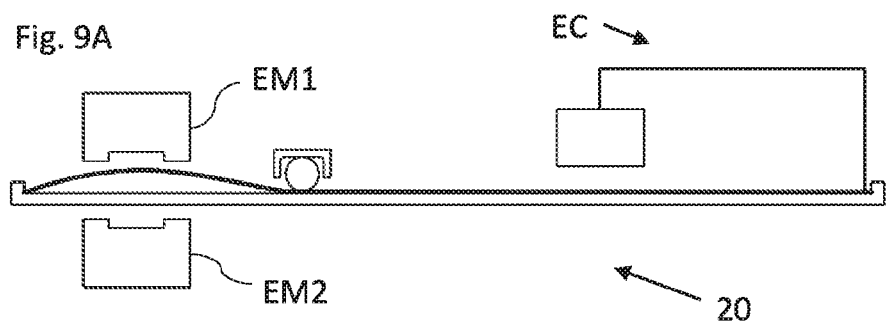
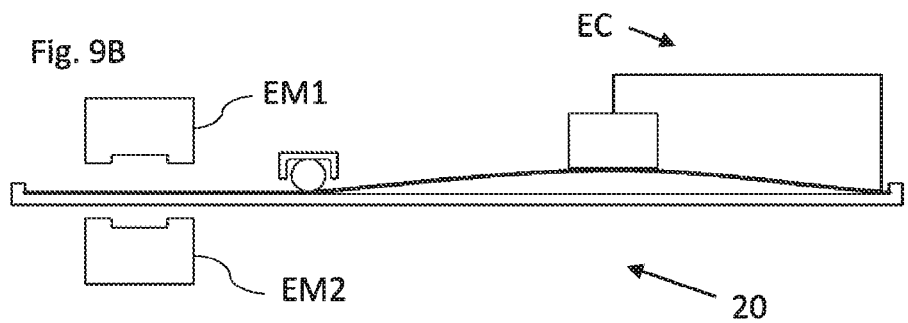
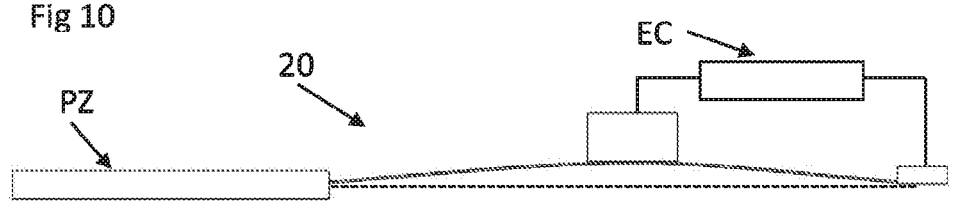

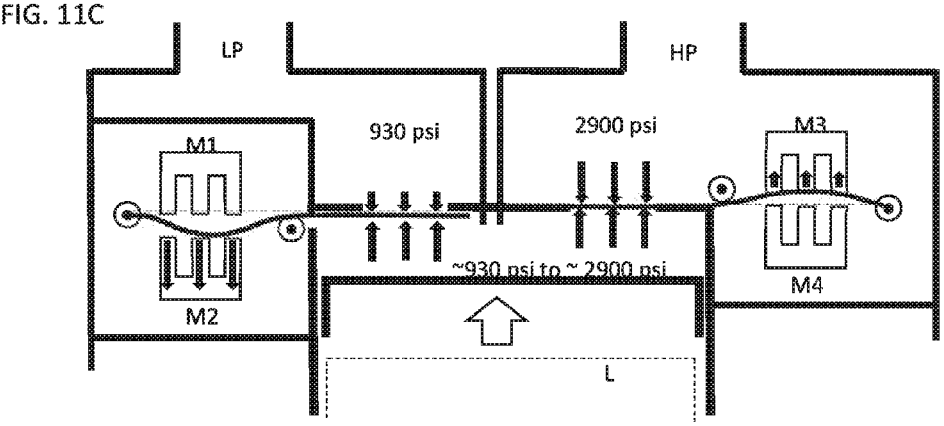
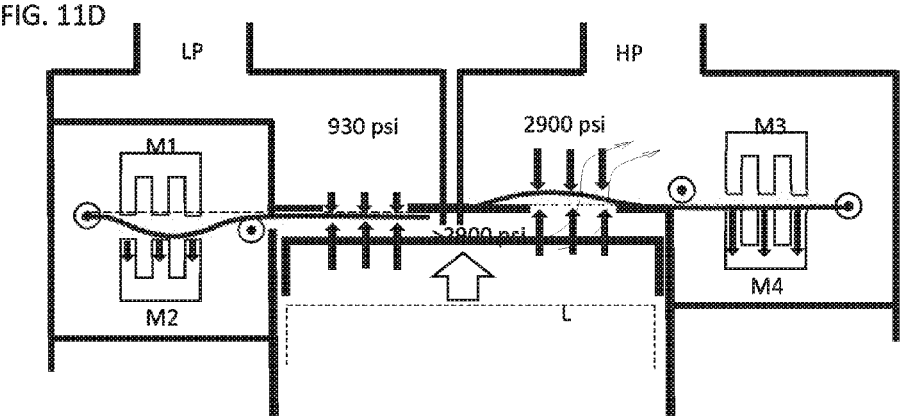

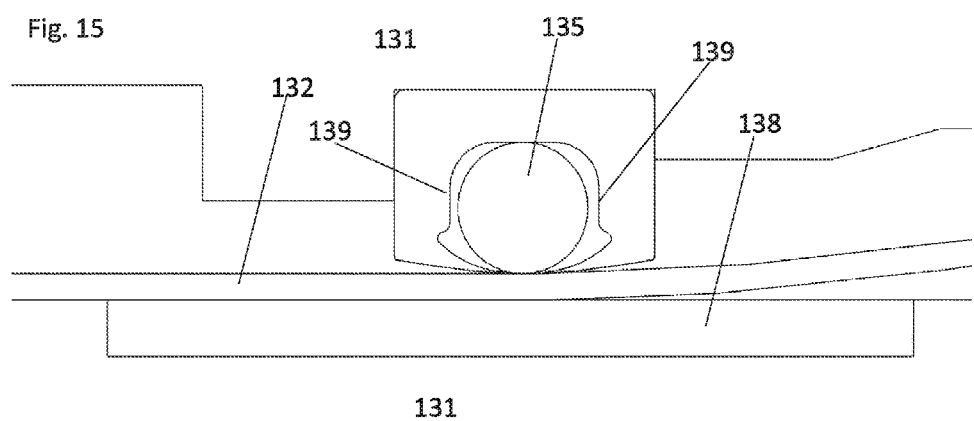
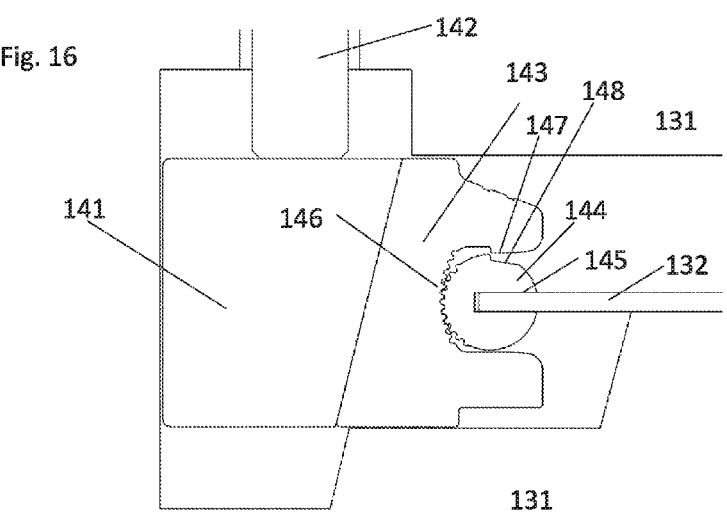

CONTROL ELEMENT WITH BUCKLED MEMBER

TECHNICAL FIELD

Control elements such as valves and switches with buckled members.

BACKGROUND

The present device is in the mechanical and industrial technical fields of pneumatics and hydraulics. More specifically the present device falls under the technical field of valving and fluid control.

This technology may also be used for applications other than pneumatics or hydraulics. High speed electrical switching is another area where high speed is advantageous and where the present device can be used. This may be for a high speed relay or for a high voltage switch to reduce arcing.

SUMMARY

The present device in one embodiment includes a control element that may act as a valve or switch that allows for active and/or passive mechanical or electromechanical control of valve or switch opening and closing. It includes a buckled beam that acts as the valve or switch, whereby the energy stored in the buckled beam member can be harnessed, suited and transferred between bistable states on either side of a pivot member such that a low actuation force and/or displacement is required to move the valve from open to closed or proportionally in-between.

In an embodiment, there is provided a control element, comprising a beam member loaded in compression to cause the beam member to buckle between opposed ends of the beam member; a transverse motion limiting member disposed between the opposed ends of the beam member and arranged to limit and control buckling of the beam member at a contact between the motion limiting member and the beam member and separate the beam ember into a first section and a second section while allowing longitudinal motion of the beam member relative to the motion limiting member and separate the beam member into a first section and a second section while allowing longitudinal motion of the beam member relative to the motion limiting member. There may also be provided an actuation mechanism disposed in relation to the beam member to operate on one or both of the first section and the second section to cause a corresponding change in the corresponding other of the first section and the second section.

BRIEF DESCRIPTION OF THE FIGURES

Embodiments will now be described with reference to the figures, in which like reference characters denote like elements, by way of example, and in which:

FIG. 1 is an isometric view of an exemplary embodiment of a valve and valve seat embodiment of a control element.

FIG. 2 is a side view of the embodiment of FIG. 1.

FIG. 3 is a top view of the embodiment of FIG. 1.

FIG. 4 is a perspective view of an exemplary embodiment of a control element designed to fit into a compressor cylinder head.

FIG. 5 shows a side view of an exemplary embodiment of a control element according to the present device in the open position.

FIG. 6 shows a side view of an exemplary embodiment of a control element according to the present device in the closed position.

FIGS. 7A-7E show some other possible embodiments of the control element illustrating possible variations of end conditions for the beam member. FIGS. 7A-7E are not a conclusive collection of all mechanisms that embody the control element, it is intended to present the operating principle behind the control element.

FIGS. 8A-8D are not a conclusive collection of all actuation methods that are embodied by the control element, it is intended to present the operating principle behind actuation of the control element. Note: schematic figures, above, show the buckled beam member in various open, closed and in-between positions.

FIGS. 9A-9B are simplified schematics showing an embodiment of a control element used as an electrical connector closing a circuit.

FIG. 10 is a schematic showing piezo ceramics used to activate an embodiment of a switch.

FIGS. 11A-11D and 12A-12F show reed valve operation schematics for a compressor.

FIGS. 13-19 show an exemplary embodiment of a control element.

DETAILED DESCRIPTION

Figure 8A:
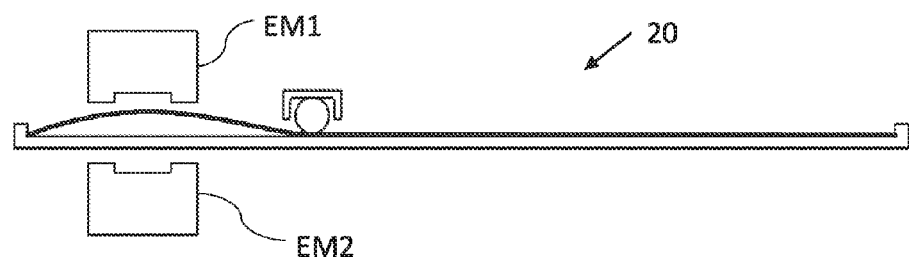
FIGS. 8A-8D are side views of a few possible embodiments of valve actuators for using the disclosed control element.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Referring now to the present device in more detail, FIGS. 1-4 show the basic assembly and construction of an embodiment of a control element 20 configured for use as a valve. A beam or beam member 21 is rigidly attached to valve seat 22 which is machined into valve block 23. The beam 21 is loaded in compression along the length of the beam 21 to cause the beam 21 to buckle between opposed ends of the beam 21. Beam 21, valve seat 22 and valve block 23 are only representations of a possible application of an embodiment of the control element, and should not limit the scope of the invention in any way. A transverse motion limiting device 24 is disposed in contact with the beam 21 between opposed ends of the beam 21 to limit motion in the transverse direction relative to the beam. The motion limiting device 24 limits transverse motion, or buckling, of the beam member 21 at the contact between the vertical motion limiting device 24 and the beam member 21 and divides the beam member 21 into a first section 25 and a second section 26 on either side of the motion limiting device 24. The motion limiting device may be a pivot, flexure, or a rocker as illustrated in FIGS. 1-4 as a possible method of creating a motion limiting member, to create an area of limited transverse motion in the beam 21. Many other longitudinally compliant beam constraining methods are conceivable, including rollers and/or flexures or sliders. Anything that limits transverse motion while allowing generally longitudinal motion with minimal friction and inertia is preferable. By reference to longitudinal motion, it is understood that it is not the entire beam that is allowed to move longitudinally relative to the transverse motion limiting member but a portion of the beam at the motion limiting member. The pivot 24 may be a geared pivot. In an embodiment, the control element may act in a passive move and rely upon fluid pressure or flow resistance to open and close the valve. In this case, the actuation mechanism is the fluid flow itself.

FIG. 5 and FIG. 6 show the control element 20 acting as a valve element in an open and a closed position, respectively, for controlling fluid flow FF through the control element 20. FIG. 5 and FIG. 6 also show the beam 21 divided into two sections: actuation area or actuation section 25 and sealing area or valve section 26. Rocker 24 limits transverse motion of the beam between the sections. Alternative variations on rocker 24 may include, such as but are not limited to: using a linear bearing, flexure, sliding surface, any mechanism for allowing linear motion while bearing a vertical load, and any combination of the aforementioned variations.

Referring now to an embodiment of a control element 20 in greater detail, the control element 20 may thus comprise a beam member 28 having an actuation section 25 and a valve section 26, the actuation section 25 and the valve section 26 being positioned on opposing sides of pivot member 24, in which active control of the actuation section 25 causes buckling of the valve section 26 to bring the valve section 26 from a closed state to an open state, or causes relaxing of the valve section 26 to bring the valve section 26 from an open state to a closed state.

The beam 21 is pre-loaded longitudinally to induce buckling. The effect of this longitudinal loading is to increase the internal longitudinal compressive stress in the buckled beam member 21 and the stored energy of buckled beam member 21 above that of its unloaded or unbuckled or unstressed state. The beam 21 uses the increased internal energy induced by buckling the valve longitudinally to actuate quickly between two bistable states with low actuation force and quick response time. Because of the stored energy and internal stress within beam 21, the force required to be applied to actuation area 25 to cycle the valve can be low. Alternatively, the force to actuate may be high, but this principle can be used to achieve higher speed movement from the valve than if it is not longitudinally loaded, or longitudinally loaded at a lower load. The beam 21 uses the increased internal energy induced by pre-loading the valve longitudinally to switch between bistable states quickly with low actuation force and quick response time. In either case, actuation force causes the beam 21 to toggle from the open position in FIG. 5 to the closed position in FIG. 6 or vice versa. The term "toggle" as used here may mean that a portion of the buckling beam member moves to a straight, near straight, or straighter position compared to when it is buckled. It may also refer to the beam member passing through a straight position to a slight curve in the opposite direction.

This configuration of opposing buckling zones means that low energy can be used to control/actuate the opening and closing of sealing area 26. Furthermore, the high level of stored energy relative to the low mass of the beam member results in the potential for a very high speed switching effect between bistable states. A further embodiment of the control element 20 has the end of beam 21 nearest sealing area 26 held tangent to valve seat 22, while the end of beam 21 nearest to actuation area 25 is allowed to pivot such that actuation area 25 can move up and down above the plane of valve seat 22. Actuation of beam 21 can be attained by devices such as but not limited to electromagnets, mechanical cams, piezo electrics, hydraulics and pneumatics, manual actuation or the force resulting from contact with another member.

Referring now to the construction of an embodiment of the control element 20, beam 21 could be made from material such as but not limited to spring steel sheet stock, stainless steel, high copper alloys, and other alloys suited to spring materials. Non-metallic materials such as plastic or fiber reinforced composites may also be used. In a non-limiting exemplary application for a compressor with a 4 inch piston such as that shown in FIGS. 1-4, beam 21 may have dimensions of 12 inches long, by 2 inches wide and 0.050 inches thick. In order to form a compressor cylinder head with an intake and exhaust valve, two of the assemblies shown in FIGS. 1-4, or a combination of components that achieves the same effect as two of the assemblies from FIGS. 1-4 may be utilized. The compressor inlet valve assembly may have the curvature of beam 21 such that it would passively (with or without actuation input) allow air to enter on the piston intake stroke. The compressor outlet valve could have the curvature of beam 21 such that air would escape on the exhaust stroke of the piston with or without actuation input.

The assembly in FIGS. 1-4 should not be seen as limiting, and is only intended to convey the basic principle of the control element 20. The slot cut into sealing surface 22 may, as a non-limiting example, have a width equal to 80% of the width of beam 21, or multiple slots could be used. The rocker 24 could be made using a standard rolling bearing, and the end of beam 21 nearest to the sealing surface 22 could be clamped tangent to sealing surface 22 using a clamp made of a material such as but not limited to mild steel.

In order to achieve favorable performance in certain operation conditions there exist variations on beam 21 such as but not limited to: biasing the shape of beam 21 concave, convex, or any combination of concave and convex sections, altering the width of beam 21 along its length, altering the length of beam 21 along its width, altering the thickness of the beam 21 along its length, and altering the material properties of beam 21 dependently or independently of geometry, and any combination of the aforementioned variations.

In order to achieve favorable performance in certain operating conditions there exist variations on valve seat 22 such as but not limited to: altering the contour to a shape other than flat, using a material other than steel such as but not limited to urethane or peek plastic, and any combination of the aforementioned variations.

Alternative exist variations on valve block 23 include but are not limited to: provisions for adjustment of the longitudinal position of rocker 24, provisions for adjustments of the angle of clamping of beam 21 at the end nearest to sealing area 26, any combination of clamped or un-clamped fixtures at the ends of beam 21, provisions for the adjustment of the length between the ends of beam 21, adjustments of material choice based on operating conditions, combination of one or more of valve block 23 with other components to create a cylinder head, integration of attributes of valve block 23 with an existing cylinder head, and any combination of the aforementioned variations. The present device may also be used as a fast acting valve in a fluid circuit or electrical switch of any size including mems devices.

Figure 8B:
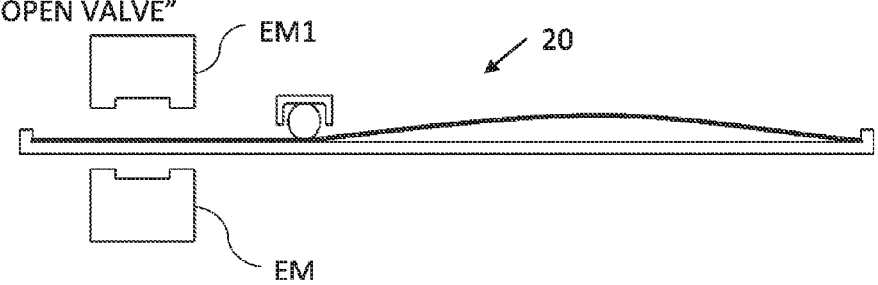

FIG. 8A shows an actuation device formed using first and second electromagnets EM1 and EM2, which are disposed to operate on a section of the beam on one side of the beam motion limiter and cause a corresponding change on the beam state on the other side of the motion limiter. The control element 20 shown in this example may be constructed in accordance with FIGS. 1-4. When current flows through first electromagnet EM1, the adjacent beam section is actuated and the other section is straightened, which in a valve embodiment may be operable to close the valve. FIG. 8B shows the actuation device of FIG. 8A where current flows through second electromagnet EM2 to open the valve.

Figure 8C:
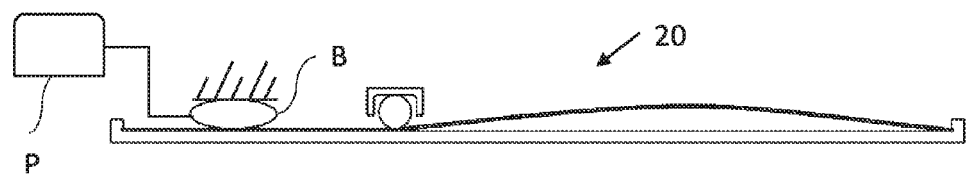

FIG. 8C shows an actuation device formed using a hydraulic or pneumatic pump P and a bag B disposed to operate on a section of the beam, in which the hydraulic or pneumatic pump P expands and contracts the bag B to move the section of the beam and cause a corresponding movement of the other section of the beam. When the control element 20 shown here, which may be made in accordance with FIGS. 1-4, the action of the control element 20 under actuation by the actuation mechanism opens and closes the valve.

A "Darlington Pair" (not shown) in which a first control element is used to actuate a second larger control element. A pressure chamber is provided between the first control element and the second larger control element, so that actuation of the first control element operates the second control element.

Figure 8D:
Figure 11A:
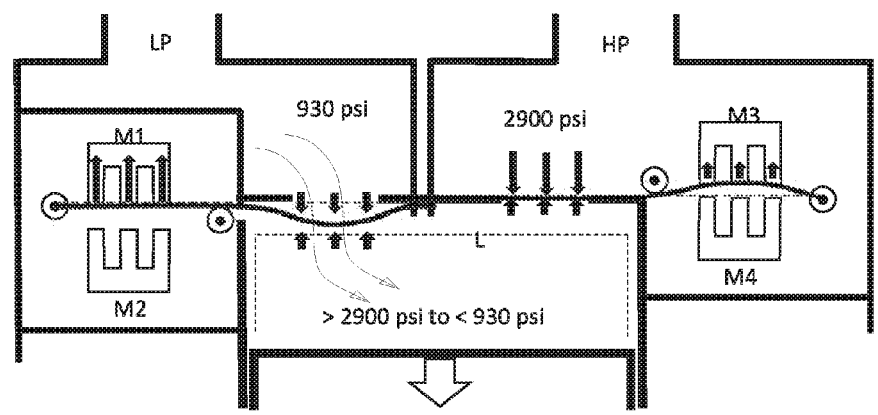
Figure 11B:
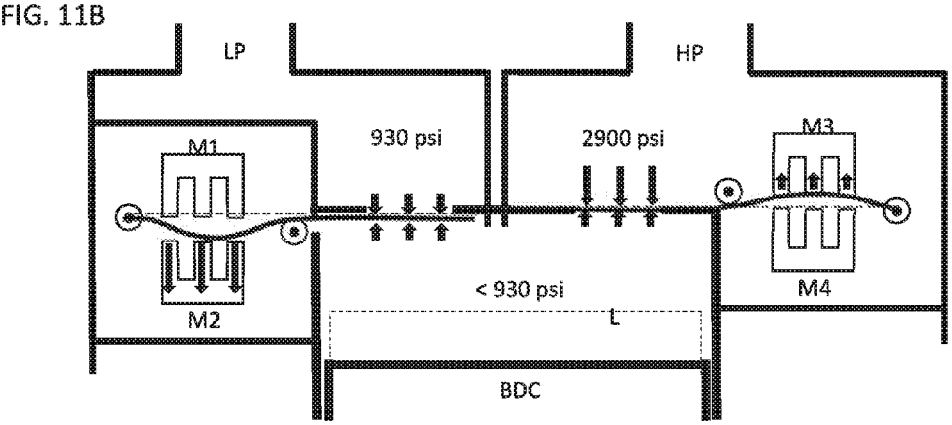
Figure 12A:
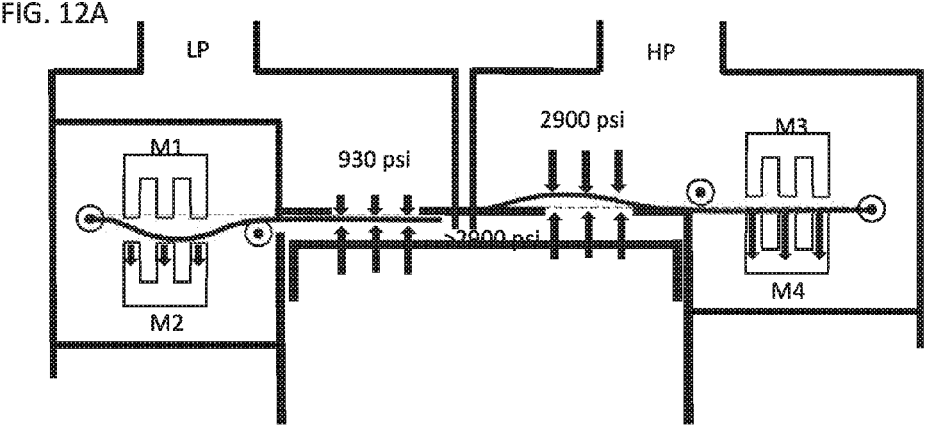
Figure 12B:
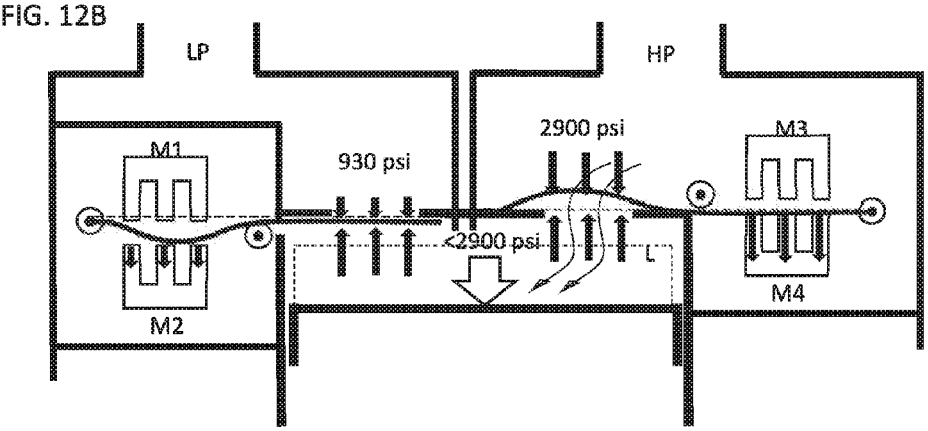
Figure 12C:
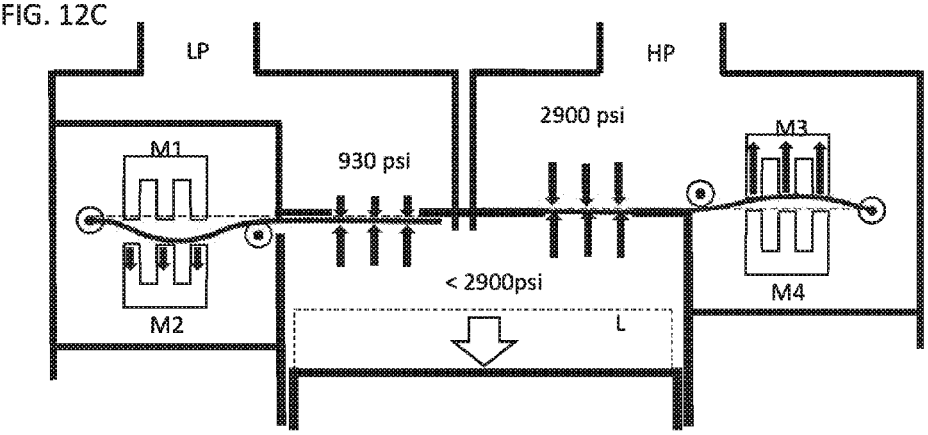
Figure 12D:
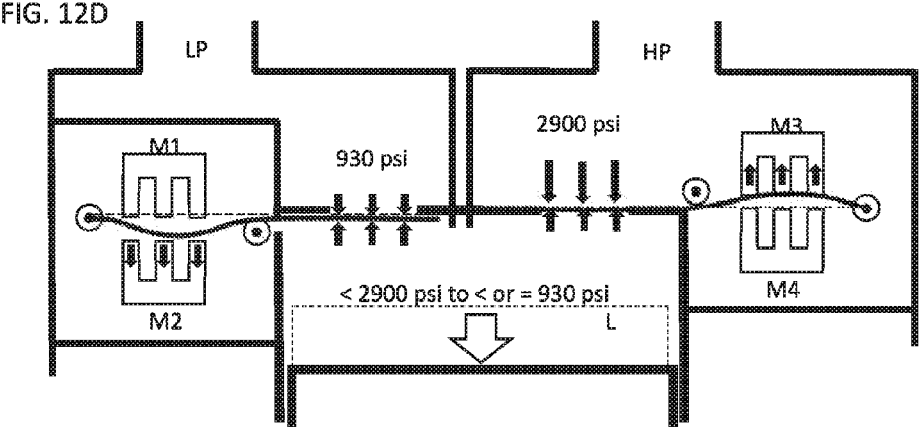
Figure 12E:
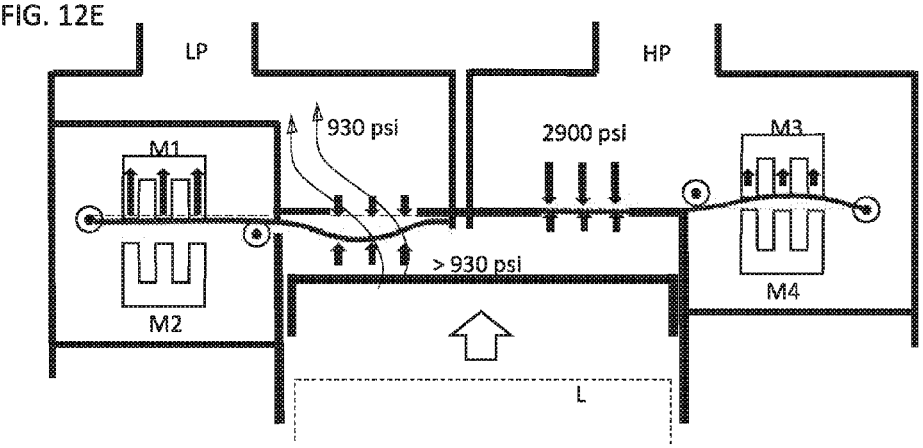
Figure 12F:
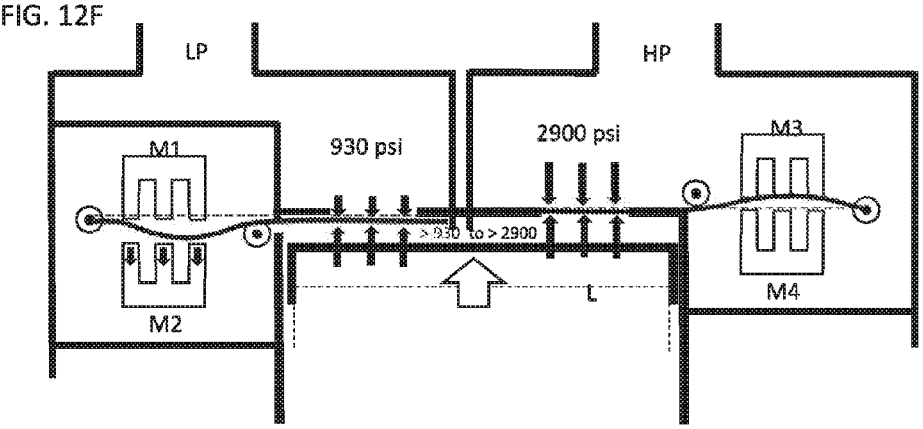

FIG. 8D shows an actuation device formed using a piezo electric mechanism. The actuation section of the beam of the control element 20 is provided with piezo electric elements PZ disposed to operate on the beam, as for example by contacting the beam. When the piezoelectric elements are energized, they act on the section of the beam to which they are attached by bending and or contacting or expanding to move the section of the beam and cause a corresponding change in the other section of the beam.

The control element 20 may be used in a compressor or as an expander with gas traveling in one or both directions across or through the control element 20, which would thus operate as a valve. It can also be used in an internal combustion engine where one or more control elements would act as an inlet valve and one or more would act as discharge valves. Both control elements, in this case would operate as check valves preventing flow out of the chamber unless actuated such as to open. Basically, the valve works passively or actively in compression mode. In expansion mode the timing of the closing of the previous valve must always be soon enough so the pressure in the cylinder (or other expansion device) decreases or increases enough to allow the cylinder pressure to equalize with the appropriate port (whether intake or discharge. This allows the next valve that needs to open, to do so not against a pressure differential.

The beam member 21 may have holes or slots for fluid flow when in the open state. The holes or slots seal against the valve seat when in the closed state.

FIGS. 9A and 9B show a simplified schematic showing the present device as an electrical connector closing an electrical circuit EC by, in this example, actuation with a magnetic actuator end. When current flows through an electromagnet EM1 and not through an electromagnet EM2, the electrical circuit EC opens. When current flows through the second electromagnet EM2 and not through electromagnet EM1, the electric circuit closes.

As shown in FIG. 10, piezo ceramics may also be used to actuate the control element 20 when used as a switch or other electrical connector for closing a circuit. MEMS switches and flow control valves may also be made with this principle.

The control element 20 may be controlled in a reversible compressor that can also act as an expander. In this application, the disclosed control element 20 may act as a check valve when closed, similar in function to a reed valve. Unlike a reed valve, however, the control element 20 can be held in the open position to allow back flow through the valve such as, but not limited to, when used in an expander. During backflow through the open valve, relatively low force is required at three actuation end to keep the beam member in the buckled state at the valve end. This is because the toggled actuation end has a mechanical advantage over the end that is in a buckled state. This allows the valve to be held open during back flow and at a high flow rate with relatively low force at the actuator end of the beam. When a closing event is desired during back flow, such as, but not limited to the end of the power/intake stroke of a piston expander cycle, the aerodynamic force of the gas backflowing through the open valve will act on the beam member to close it at high speed when the magnet is deactivated and/or the magnet is activated.

Other applications that the buckled beam design may be used for can consist of any type of fast acting device, such as, but not limited to: electrical or mechanical triggers, high voltage switches, mechanical MEMS applications, metering valves, mass flow metering valves, mass flow controller, PWM nozzles, and sensing applications.

Applications include but are not limited to automotive, aerospace, spacecraft, power generation machines, energy storage systems, industrial products, consumer products and anywhere that high speed and/or light weight actuation are required.

Exemplary Schematic of Reed Valve Operation Schematics:

Shown in FIGS. 11A-11D and 12A-12F is a non-limiting example of how the present device can be applied to a gas compressor which can also be operated in reverse as an expander. In this example, the discharge pressure is shown at 2900 psi. Note that, unlike a cam driven valve system, the control element 20 allows a displacement device such as, but not limited to a piston compressor and/or expander to be operated in compressor mode or expander mode and can operate with the piston and crankshaft (or other piston actuation method) running in either direction. The control element 20 can also be used in other compressor or expander devices such as bounce piston engines or compressors or expanders or rotary compressors or expanders. This exemplary embodiment is given as a non-limiting example of one of many conceivable and anticipated configurations and applications. Actuation means, other than electromagnets as shown in this non-limiting example, may also be used.

In FIGS. 11A-12D and 12A-12F, LP means low pressure and HP means high pressure. Dotted piston line L shows the starting position of the piston at each step. The boundary lines show the inlet and discharge chambers (variously, the LP and HP chambers are inlet and discharge chambers). The length of the arrows in the ports between the HP or LP chambers and the cylinder indicate the relative pressure between the HP and LP chambers and the cylinder. The arrows in magnets M1, M2, M3 and M4 indicate relative magnetic force between each of the magnets. The boundary around magnets M1 and M2 may be connected/vented to the cylinder volume. Alternately, the chamber which houses magnets M1 and M2 may be sealed from the cylinder volume. This requires a seal around the buckling member and pivot member of the LP valve. The boundary around magnets M3 and M4 are located within the HP chamber which is sealed form the cylinder volume.

Note that the length of the magnetic force arrows indicates the power required at various phases. Specifically, the magnetic force required to initiate the actuation event is typically (but not necessarily) greater than the magnetic force required to hold the beam member in that position.

FIGS. 11A-11D show a non-limiting example of the present device operating sequence as it could be used in gas compressor mode, and the following table describes the steps a, b, c and d:

| Crank Angle | Magnet 1 | Magnet 2 | LP valve | HP valve | Magnet 3 | Magnet 4 |
|---|---|---|---|---|---|---|
| a. Near and after TDC to 180° Low pressure intake phase (starts at TDC and slightly above HP discharge pressure) | ON | OFF | OPEN Valve opens near beginning of phase when pressure in cylinder drops to below the pressure in the LP inlet supply | CLOSED | ON (this may or may not be necessary in some configurations as the back-pressure may keep valve closed and sealed) | OFF |
| b. BDC Intake Valve closes | OFF | ON | CLOSES | CLOSED | ON | OFF |
| c. 180°-270° Compression increases cylinder pressure up to discharge pressure | OFF | ON | CLOSED | CLOSED | ON | OFF |
| d. 270°-TDC discharge at constant pressure | OFF | ON | CLOSED | OPEN | OFF | ON |

Step a shows Intake phase which starts near Top Dead Center and progresses to near Bottom Dead Center as shown.

Step b shows Intake valve closure event near Bottom Dead Center.

Step c shows compression phase which starts near Bottom Dead Center and ends before Top Dead Center.

Step d shows discharge phase which starts before Top Dead Center near where cylinder and discharge port pressure equalize, and ends near Top Dead Center.

FIGS. 12A-12F show the same valve configuration as it could be used in gas-powered motor or expander mode, and the following table describes the steps a-f:

| Crank Angle | Magnet 1 | Magnet 2 | LP valve | HP valve | Magnet 3 | Magnet 4 |
|---|---|---|---|---|---|---|
| A. Before and near or at TDC HP inlet valve opens at near zero flow. | OFF | ON (this may or may not be necessary in some configurations as the back-pressure may keep valve closed and sealed) | CLOSED | OPENS (when cylinder and HP source pressure equalize) | OFF | ON |
| B. 0°-90° HP inlet. Constant pressure phase of power stroke. (90 deg is used here as a non-limiting example. The ideal angle for the end of this step is determined by the CPU based on process conditions. See note in step C) | OFF | ON (this may or may not be necessary in some configurations as the pressure in the cylinder may keep the valve closed and sealed) | CLOSED | OPEN | OFF | ON |
| C. 90 deg. HP inlet valve closing event (90 deg is used here as a non-limiting example. The ideal angle for this inlet | OFF | ON | CLOSED | CLOSED | ON | OFF |

| Crank Angle | Magnet 1 | Magnet 2 | LP valve | HP valve | Magnet 3 | Magnet 4 |
| --- | --- | --- | --- | --- | --- | --- |
| valve closing event is determined by the CPU based on process conditions. The ideal piston displacement for this event is preferably timed so the pressure in the cylinder after this event drops to slightly lower pressure than the discharge port pressure when the piston is at BDC. This allows the pressure to equalize on both sides of the discharge valve allowing it to open near BDC against minimal backpressure or without having to overcome any backpressure) | | | | | | |
| D. 90°-BDC Last part of expansion phase | OFF | ON (this may or may not be necessary in some configurations as the back-pressure may keep valve closed and sealed) | CLOSED | CLOSED | ON (optional due to HP source pressure maintaining inlet valve in closed position) | OFF |
| E. 180°-300° LP discharge valve opens at BDC and gas is discharged at near constant pressure to 300 deg. (300 deg is used here as a non-limiting example. The preferred total angle of this phase is determined by the correct timing of event "F." | ON | OFF | OPEN | CLOSED | ON | OFF |
| F. 300 deg to TDC LP discharge valve closes and cylinder pressure increases to slightly higher than HP inlet pressure when Piston is near and preferably before TDC (300 deg is used here as beginning of this step as a non-limiting example. The preferred angle for this discharge valve closing event is determined by the CPU based on process conditions. The ideal crank angle and piston position for this event is preferably timed so the pressure in the cylinder after this event increases to slightly higher pressure than the inlet port pressure when the piston proceeds to at or near TDC. This allows the pressure to equalize on both sides of the inlet valve allowing the valve to open near TDC allowing it to overcome minimal backpressure or without having to overcome any backpressure) | OFF | ON | CLOSES | CLOSED | ON or LOW POWER or OFF (Shown in figure as off) | OFF |

In step A, HP valve opens at or near and preferably before TDC. Pressure in cylinder preferably reaches HP source pressure slightly before TDC (as a result of closing the LP discharge valve at the correct position during discharge phase E to cause the cylinder pressure to ramp up to slightly above HP inlet pressure at TDC). This creates a situation where the HP valve does not need to open against the backpressure of the High Pressure intake port because the pressure on both sides of the valve is equalized or slightly greater on the cylinder side of the valve. This may cause a small volume of gas to be discharged from cylinder into the HP inlet port before TDC. This is considered, by the inventor to be preferable to the cylinder pressure not reaching the pressure of the HP inlet port because this could prevent the inlet valve from opening.

In step B, there is shown an inlet valve closure event during expansion. The high speed characteristic of the control element 20 has a significant benefit in this case, especially, because the faster the valve closes, the lower the throttling losses during the valve closure. The timing of this valve closure is determined by the CPU based on process conditions such that the remaining piston travel to, or slightly before, BDC is adequate for the cylinder pressure to drop to the discharge port pressure or slightly below the discharge port pressure at or preferably slightly before BDC as described in step C.

In step C there is shown an expansion from HP valve closure event B to near or at BDC. Step D shows discharge phase.

Step E shows LP valve closure event. The high speed characteristic of the present device has a significant benefit in this case as well, because the faster the discharge valve closes during the discharge phase, the lower the throttling losses during the valve closure. The timing of this valve closure is determined by the CPU based on process conditions such that the remaining piston travel to, or slightly before, TDC is adequate for the cylinder pressure to rise to the intake port pressure or slightly above the intake port pressure at or preferably slightly before TDC as described in step A.

The buckled member can have a permanent magnet and/or soft magnetic material attached to it to increase the magnetic attraction and/or repelling force of an electromagnet.

The valve can be used with gas or liquid with a variety of control sequence and valve timing strategies, some of which are given here as non-limiting examples.

Spinodal bronze is a preferred material for the pivots and/or rocker bearing and/or the flat sliding surface opposite the rocker bearing. Many other materials may also be used in different applications.

Figure 13:
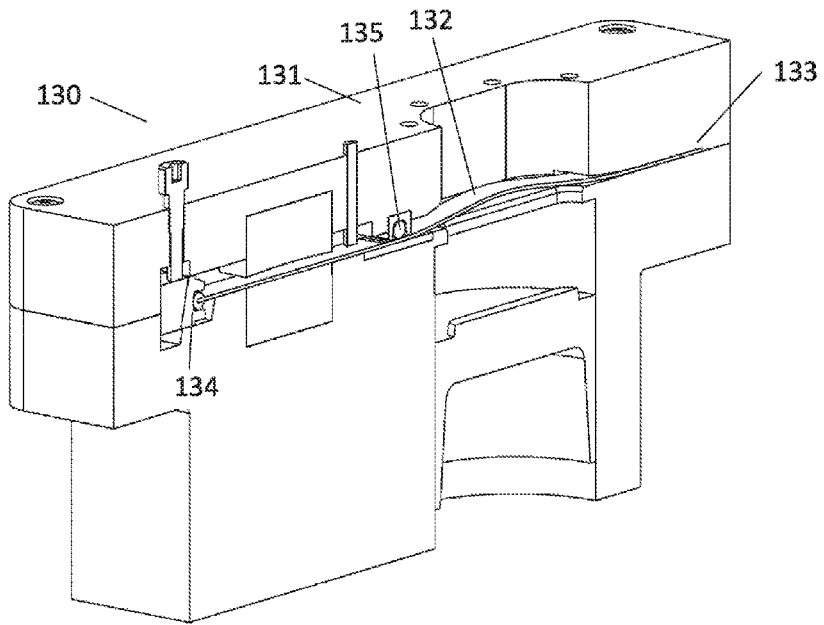

A simplified schematic non-limiting exemplary embodiment of the present device 130 is shown in FIG. 13 configured as the discharge valve of a compressor. This configuration could also be used as an inlet valve for an expander. An inlet valve from a low pressure source is also needed in a compressor application but is not shown in FIGS. 13-19 for simplicity.

Figure 14:
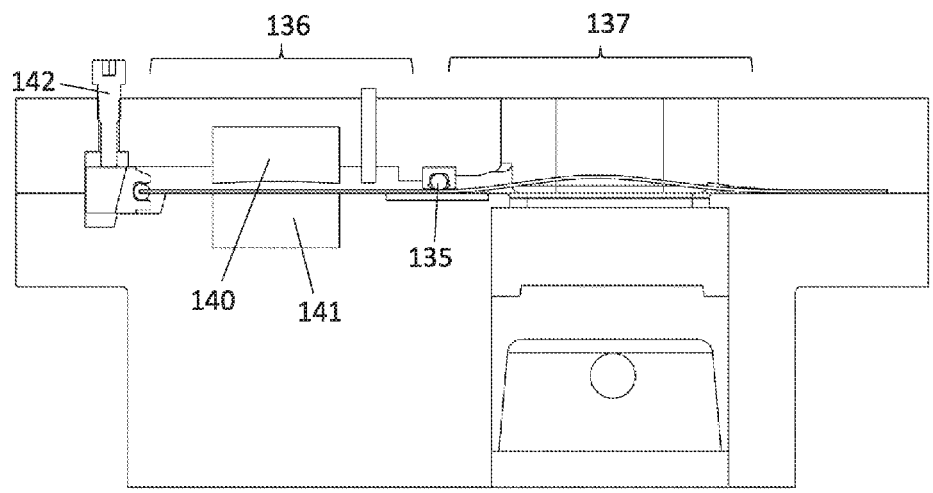

Referring to FIG. 13, the housing 131 includes a means of holding the end of the buckling valve member 132 at one end 133, and a means of allowing the member to pivot at the actuation end 134. FIG. 14 shows how a rocker element 135 separates the actuation end 136 of the member 132 from the valve/flow control end 137. The rocker element 135 in this non-limiting example, consists of a rolling cylindrical bearing, but could be of any construction including a stationary roller bearing on a shaft, or a flexure or many other conceivable methods of maintaining a controlled height of the member 132 in the area where it is in contact with the rocker 135, while allowing lengthwise movement of the buckling member 132 where it contacts the rocker 135.

This non-limiting example uses a buckling member 132 that is 10" long and 1" wide with a thickness of 0.04". The vertical deflection of the flow control end 136 of the buckling member 132 may be from 0.001" or less to as large as 0.5" or more when open, depending on the flexibility of the member 132 material and other system requirements such as, but not limited to flow rate. Due to the high speed actuation of this device which allows for a very high number of cycles, the bending stress on the member 132 is preferably kept below the fatigue strength of the material. A prototype of a similar valve configuration demonstrated a closing speed of less than a millisecond.

Electromagnets 140, 141 are fixed to the housing above and below the buckling member 132 at the actuation end 136 of the valve 130. Electromagnets or other actuation means can also be located at and act on the member 132 at the flow end of the valve 137 (said actuation members not shown here).

In FIG. 15, a low wear and preferably low friction insert 138 made of a material such as, but not limited to spinodal bronze, is located proximal to the lower surface of the member 132 opposite the rocking member bearing 135. The purpose of rocking member 135 and insert 138 are to allow lengthwise movement of the member 132 in this area, without allowing unwanted vertical movement of the member 132 in this area. When a rolling bearing element is used for member 135, lengthwise motion restricting surfaces 139 are preferably used to position the element 135 within a predetermined maximum lengthwise displacement.

A means for adjusting the lengthwise preload on the member 132 is shown in FIG. 16. Many other adjustment methods are conceivable and anticipated by the inventor. In this non-limiting example, a wedge shaped member 141 is positioned between the housing 131 and the fixed pivot member 143. The wedge member 141 is adjusted vertically by a threaded bolt 142 (threads not shown here) to cause the fixed pivot member 143 to move horizontally along the lengthwise axis of the buckling member 132 during adjustment, when the bolt 142 and wedge member 141 are adjusted. Once adjusted, the fixed pivot member 143 remains stationary.

The buckling member 132 can contact the adjustment block directly (not shown here) or, preferably, a rolling contact member 144, as shown here with a larger contact area than the end of the member 132, can be used to reduce the contact pressure of the rolling contact area. The rolling contact member 144 has a receiving slot 145 for the end of the buckling member 132 and also preferably has a rolling contact surface with a meshing engagement geometry 146 which allows vertical rolling contact between the fixed and rolling contact pivot members 143 and 144 but prevents vertical sliding of the rolling contact pivot member 144 relative to the fixed pivot member 143.

Figure 17:
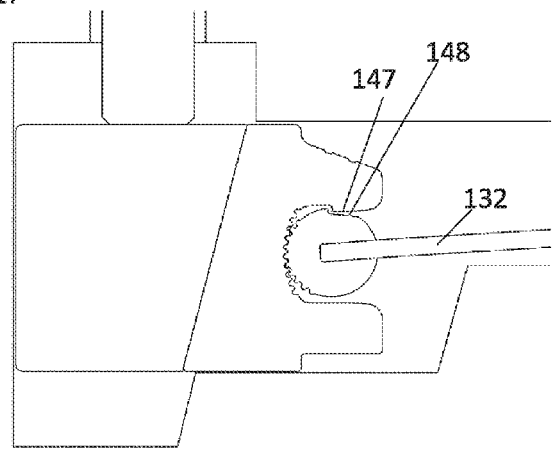

The rounded teeth 146 on members 143 and 144 can be of any suitable tooth profile and are preferably small enough to allow a smooth rolling contact during actuation of member 132. To allow correct vertical alignment of the teeth 146 during assembly, the protruding surface 147 on the fixed pivot member 143 ensures that the teeth 146 on the rolling contact member 143 engage correctly with the teeth 46 on the member 143. The reduced radius area 148 on the rolling contact member allows vertical rolling displacement of the rolling contact member, but only after the correct teeth are fully engaged during assembly. FIG. 17 shows how the reduced radial distance area 148 and protrusion 147 clear each other when the actuation end 136 of member 132 is buckled during operation.

Figure 18:
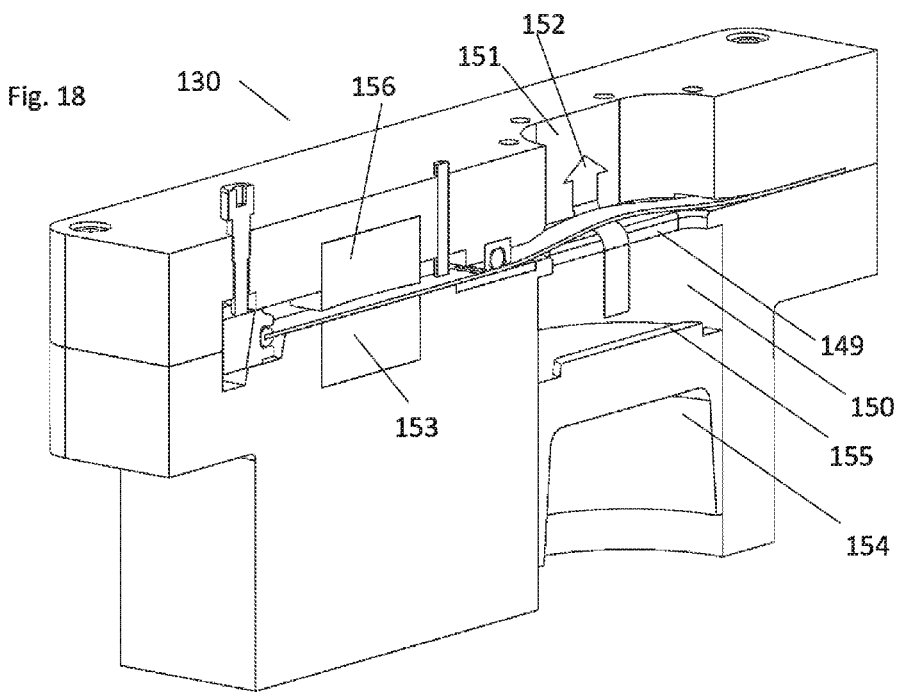

As shown in FIG. 18, the valve 130 is in the open position when the valve end 137 of the member 132 is buckled due to the toggling/straightening of the actuation end 136 of the member 132. This allows gas or liquid to flow up through the discharge port/s 149 in the cylinder 150 and laterally into the high pressure discharge cavity 151 as illustrated by the arrow 152. Energizing the lower electromagnet 153 (or other actuation means on the top and/or bottom and/or side of the buckling member that causes the actuation end of the buckling member to flatten) holds the flow control end 137 of the buckling member 132 in the open position above the cylinder 150 as shown here. Energizing the electromagnet 153 (or other actuation means) in this way can also hold the buckled member 132 in this open position on the valve end 137 against a backflow of liquid or gas, such as, but not limited to when the valve 130 is used to drive a gas expander or hydraulic motor. When the valve 130 is used, for a non-limiting example, with a piston as a compressor or expander, it is preferable for the piston 154 to have a protrusion 155 that takes up a percentage of the volume in the discharge/inlet port 149. This is to increase the compression and/or expansion ratio of the piston 154 and cylinder 150 by reducing the gas volume at Top Dead Center.

Figure 19:
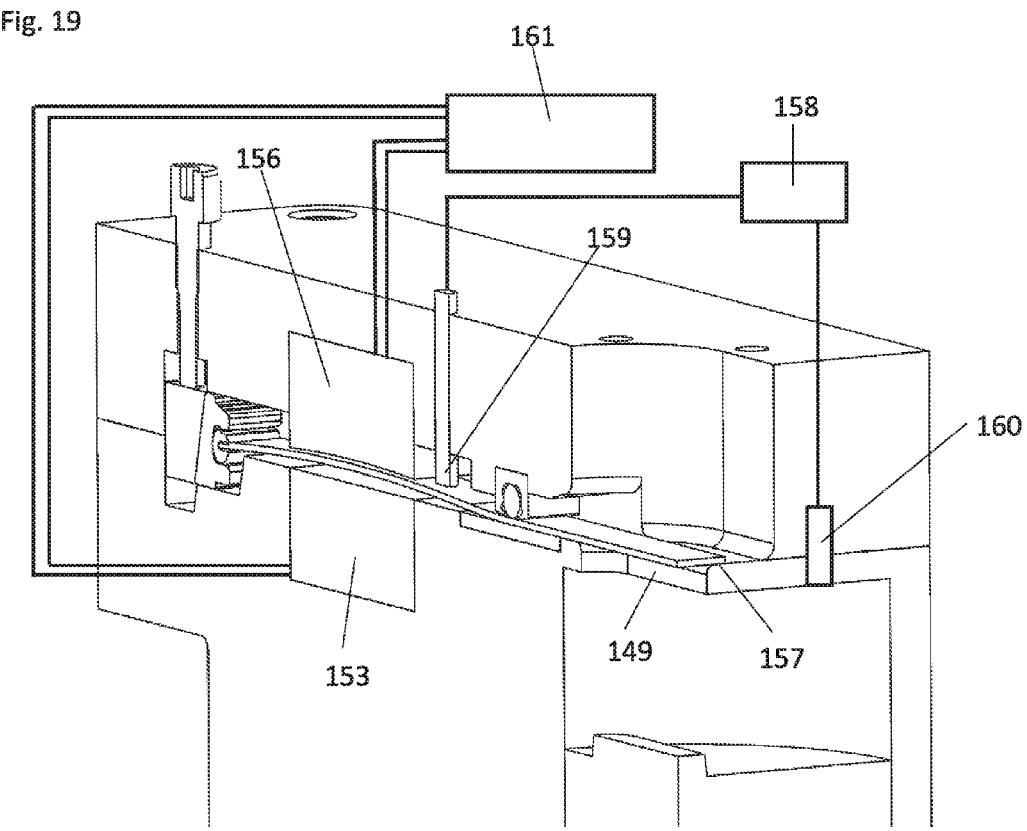

When the lower electromagnet 153 is de-energized and the upper electromagnet 156 (or other actuation means on the top and/or bottom and/or side of the buckling member that causes the actuation end 136 of the buckling member 132 to bend and buckle) is energized, as shown in FIG. 19, the flow control end 137 of the valve 130 will close. This causes the buckling member 132 to create a sealed zone 157 surrounding the port 149. The pressure of the fluid in discharge port 151 provides the contact pressure necessary for a fluid-tight seal when the valve 130 is closed and when the pressure in the cylinder 150 is lower than the pressure in the port 151. This sealing action is similar to that of a passive reed valve. A significant benefit of the present device is that the buckling member 132 can be held open, when desired, to allow backflow from the port 151 into the cylinder 150, such as, but not limited to, when the present device is used to control the flow of fluid into a cylinder or other device, such as, but not limited to when the present device is used with an expander or hydraulic motor.

Note, for applications such as, but not limited to a compressor, two of the present device valves are preferably used per cylinder. One will be configured similar to FIGS. 13-19. The other will preferably be inverted as shown in valve timing sequence described in FIGS. 11 and 12, so that it opens into the cylinder 150, rather than away from it. This will allow a combination of two valves 130 to be used to control inlet flow to the same cylinder 150 and discharge flow from the cylinder 150. The present device can be operated passively, as a check valve in some applications where the forces exerted by the flow of the fluid are adequate to provide the force on the flow end 137 to open and/or close the valve. This is considered to be more effective when the present device is used with non-compressible fluids rather than less dense compressible fluids. This passive operation mode may be used in combination and at various times together with active control. There are many conceivable ways to operate the valve in active mode. A non-limiting example is shown in FIG. 19 where a CPU 158 receives input from piston position sensors 160 and a valve position sensor 159 such as, but not limited to, an eddy current sensor or ultrasonic sensor or optical sensor. The CPU 158 determines the correct opening and closing times for one or more valves and sends a control signal to the valve driver 161 to energize or de-energize the electromagnets 153 and 156 at the appropriate times to control the optimal valve actuation timing according to a predetermined valve timing sequence such as but not limited to that described in FIGS. 11 and 12.

A slight pre-bend may be provided in the buckling members to prevent locking when an end is toggled/not buckled.

The disclosed control element 20 allows for active control and actuation of the valve using electromagnets, hydraulics, pneumatics, piezo-electrics, or any other method of actuation.

A disclosed control element 20 may operate in the setting of a compressor, expander, or both, in a system that requires forward and/or reverse flow of a fluid using active or passive control, and is capable of use in an internal or external combustion engine.

In some embodiments, both sections of the beam on either side of the transvers motion limiter may be actuated. The reference to "one of the sections" in the claims does not exclude this possibility. Thus, in a valve case, there may be direct actuation of the sealed end of the valve in addition to or without actuation of the control end.

In some embodiments, both ends of the beam, on either side of the transverse motion limiter or rocker mechanism may act as flow control valves for the same or different flow circuits.

What is claimed is:

1. A control element that is configured to act as a valve or switch and that allows for control of the valve or switch opening and closing, the control element comprising:
   a buckled beam member loaded in compression to cause the buckled beam member to buckle between a first constrained end and a second constrained end of the buckled beam member; and
   a motion limiting member disposed between the first constrained end and the second constrained end of the buckled beam member and arranged to limit buckling of the buckled beam member and separate the buckled beam member into a first section at the first constrained end and a second section at the second constrained end while allowing longitudinal motion of the buckled beam member relative to the motion limiting member, in which buckling of the buckled beam member at the first constrained end causes the second section to straighten from the motion limiting member to the second constrained end.

2. The control element of claim 1 further comprising an actuation mechanism disposed in relation to the buckled beam member to operate on one of the first section and the second section to cause a corresponding change in the other of the first section and the second section.

3. The control element of claim 2 in which the actuation mechanism comprises electromagnets, hydraulics, pneumatics, or piezo-electrics.

4. The control element of claim 2 in which the actuation mechanism comprises an additional control element.

5. The control element of claim 1 in which the motion limiting member comprises a pivot.

6. The control element of claim 1 configured as a valve.

7. The control element of claim 6 in a compressor.

8. The control element of claim 7 in an expander.

9. The control element of claim 1 in an internal or external combustion engine.

10. The control element of claim 1 configured as a switch.

11. The control element of claim 10 connected in an electrical circuit.

12. A control element according to claim 1 in a compressor and configured to open toward a compression chamber.

* * * * *